(12) United States Patent
Kaus et al.

(10) Patent No.: US 9,367,374 B2
(45) Date of Patent: Jun. 14, 2016

(54) HANDLING SYSTEM INTERRUPTS WITH LONG RUNNING RECOVERY ACTIONS

(71) Applicant: LENOVO ENTERPRISE SOLUTIONS (SINGAPORE) PTE. LTD., Singapore (SG)

(72) Inventors: Jonathan L. Kaus, Rochester, MN (US); Adam C. Lange-Pearson, Rochester, MN (US); Gary R. Ricard, Chatfield, MN (US); Jaimeson Saley, Rochester, MN (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 185 days.

(21) Appl. No.: 14/170,668

(22) Filed: Feb. 3, 2014

(65) Prior Publication Data
US 2015/0205660 A1      Jul. 23, 2015

Related U.S. Application Data

(63) Continuation of application No. 14/158,935, filed on Jan. 20, 2014.

(51) Int. Cl.
| | | |
|---|---|---|
| G06F 11/07 | (2006.01) | |
| G06F 13/24 | (2006.01) | |
| G06F 9/38 | (2006.01) | |

(52) U.S. Cl.
CPC .............. *G06F 11/0745* (2013.01); *G06F 9/38* (2013.01); *G06F 11/0706* (2013.01); *G06F 11/0721* (2013.01); *G06F 11/0784* (2013.01); *G06F 11/0793* (2013.01); *G06F 13/24* (2013.01); *G06F 11/0772* (2013.01); *G06F 2201/81* (2013.01); *G06F 2211/002* (2013.01)

(58) Field of Classification Search
CPC ............ G06F 11/0772; G06F 11/0721; G06F 11/0728
See application file for complete search history.

(56) References Cited

U.S. PATENT DOCUMENTS

| | | | | | |
|---|---|---|---|---|---|
| 5,095,526 | A | * | 3/1992 | Baum | G06F 13/24 710/267 |
| 5,153,881 | A | * | 10/1992 | Bruckert | G06F 11/0712 714/10 |
| 5,418,968 | A | * | 5/1995 | Gobeli | G06F 13/26 710/260 |
| 5,594,905 | A | * | 1/1997 | Mital | G06F 9/4818 710/260 |
| 7,805,634 | B2 | * | 9/2010 | Balazich | G06F 11/0772 714/10 |
| 2004/0078732 | A1 | * | 4/2004 | Meaney | G06F 11/0724 714/57 |
| 2006/0230209 | A1 | * | 10/2006 | Gregg | G06F 9/546 710/263 |
| 2007/0038818 | A1 | * | 2/2007 | Greenfield | G06F 13/24 711/152 |
| 2008/0178048 | A1 | * | 7/2008 | Balazich | G06F 11/0724 714/48 |
| 2013/0332781 | A1 | * | 12/2013 | Jayakumar | G06F 11/0751 714/49 |

(Continued)

OTHER PUBLICATIONS

U.S. Appl. No. 14/158,935, entitled Handling System Interrupts with Long Running Recovery Actions, filed Jan. 20, 2014.

*Primary Examiner* — Joseph Schell
(74) *Attorney, Agent, or Firm* — Patterson + Sheridan, LLP

(57) ABSTRACT

A method, processor, and computer system for handling interrupts within a hierarchical register structure. The method includes receiving at a root-level register an indication of an interrupt occurring at a lower level register in the register structure, using a system interrupt handler to invoke an error handler assigned to a set of registers of the structure that includes the lower level register, and using the invoked error handler to handle the interrupt and return to the system interrupt handler.

18 Claims, 5 Drawing Sheets

(56) References Cited

U.S. PATENT DOCUMENTS

2014/0188829 A1\* 7/2014 Ranganathan .... G06F 17/30289 707/705

2014/0281091 A1\* 9/2014 Yamazaki ............... G06F 13/24 710/267

2014/0344491 A1\* 11/2014 Ziarnik ................... G06F 13/24 710/262

\* cited by examiner

HANDLING SYSTEM INTERRUPTS WITH LONG RUNNING RECOVERY ACTIONS

CROSS-REFERENCE TO RELATED APPLICATIONS

This application is a continuation of co-pending U.S. patent application Ser. No. 14/158,935, filed Jan. 20, 2014. The aforementioned related patent application is herein incorporated by reference in its entirety.

BACKGROUND

The present invention relates to handling processor interrupts, and more specifically, to handling interrupts within a hierarchical interrupt register structure.

In computing systems, interrupts are used to alert a processor to an event that has occurred within the system that requires immediate attention. Interrupts generally cause the processor to halt the execution of the current thread, save data related to its current state, and execute an interrupt handler to address the event that caused the interrupt. Once the interrupt handler has completed its routine, the processor resumes execution of the thread using its saved state data.

Naturally, speed of execution is an important concern for system interrupt handlers, as the time spent by a system interrupt handler to handle various interrupts directly reduces the amount of time and processing resources that would otherwise be available to execute computing threads. Thus, numerous interrupts, or even a few interrupts that require long-running recovery actions, can drastically reduce the performance and functionality of the system through excessive amounts of processing time spent handling those interrupts.

SUMMARY

Embodiments described herein provide a method, processor, and computer system for handling interrupts within a hierarchical register structure. In one embodiment, the processor and computer system include a system interrupt handler, a hierarchical interrupt register structure having one or more root-level registers configured to indicate an interrupt occurring at a lower level register in the structure, and one or more lower levels in the structure, each having one or more registers.

In another embodiment, the method includes receiving an indication at a root-level register of an interrupt occurring at a lower level register in the structure, using a system interrupt handler to invoke an error handler that is assigned to a set of registers of the structure that includes the lower level register, and using the error handler to handle the interrupt and return to the system interrupt handler.

BRIEF DESCRIPTION OF THE SEVERAL VIEWS OF THE DRAWINGS

So that the manner in which the above recited aspects can be understood in detail, a more particular description of embodiments of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

To minimize the impact on system operation caused by handling interrupts, system interrupt handlers are typically designed to respond to interrupts by executing prescribed recovery or failure actions and returning to the system's computing threads as quickly as possible. Traditional interrupt handlers often focus on optimizing recovery/failure actions for quick execution, and may generally avoid grouping different types of interrupts into a hierarchy as different interrupts may each require different amounts of time to process, and may each have a differing impact on system operation. Further, additional time may be required to navigate the interrupt hierarchy to locate the particular interrupt, even before the interrupt handler can complete the prescribed actions and return to the computing threads.

Embodiments described herein provide a method, as well as a processor and computer system, for handling interrupts within a hierarchical register structure. The method includes receiving an indication at a root-level register of an interrupt occurring at a lower level register in the structure. The root-level registers may be configured to represent different classes of interrupts, such that an interrupt indication coming from a particular register may immediately indicate the class of interrupt. To handle the interrupt, a system interrupt handler invokes an error handler that is assigned to a set of registers of the structure that includes the lower-level register. Each error handler may be configured to handle a respective subset of all possible interrupts of the structure; that is, each error handler may be assigned to particular register(s), or alternately may be assigned to particular bit(s) within one or more registers. The system interrupt handler may selectively route an interrupt to a particular error handler from a plurality of error handlers; for example, the selective routing may be based on the class of interrupt and/or based on an amount of time required to execute the recovery action prescribed for the interrupt.

Figure 1:
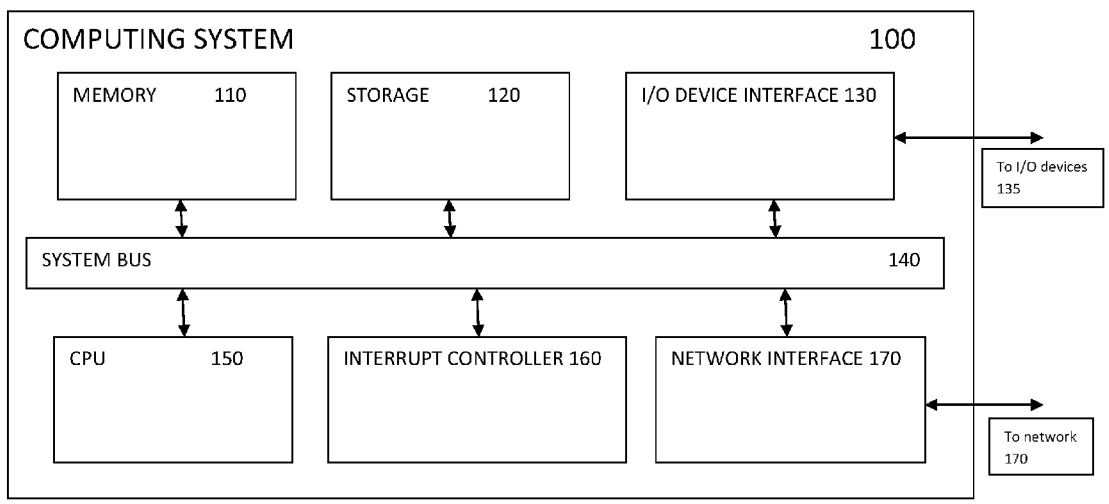
FIG. 1 illustrates a computing system capable of employing a hierarchical interrupt register structure, according to one embodiment described herein.

FIG. 1 illustrates a computing system capable of employing a hierarchical interrupt register structure, according to one embodiment. As shown, computing system 100 includes several components, such as memory 110, storage 120, input/output (I/O) device interface 130 (for connecting the computing system with one or more I/O devices 135), CPU 150, interrupt controller 160, and network interface 170. Each of the components of the computing system may be interconnected and communicate through system bus 140.

CPU 150 may include any processing element capable of performing the functions described herein. The CPU is intended to represent a single processor, multiple processors, a processor or processors having multiple cores, as well as combinations thereof. The memory 110 may be either volatile or non-volatile memory, and may include a random access memory (RAM), Flash memory, cache, disk drives, solid state drives, and the like. Although shown as a single entity, the memory may be divided into different memory elements, such as RAM and one or more hard disk drives. Storage 140 may typically provide a non-volatile memory for the computing system, and may include one or more different storage elements such as a hard disk drive, a solid state drive, an optical storage device, or a magnetic storage device.

Network interface 170 is configured to connect computing system 100 to other computing systems, workstations, or devices via network 175. The network interface may use any suitable method to interconnect electronic devices, and may include a combination of hardware and software that allow communicating with the network. Software included in the network interface may manage communication with other computing systems via one or more suitable network protocols; for example, using TCP/IP.

Interrupt controller 160 is generally configured to receive interrupt signals during operation of the computing device and to manage handling of the interrupts, so that the CPU may quickly return to executing computing threads. The interrupt signals may be generated by any feasible means, such as by software executing on the computing system, or by hardware devices coupled to the computing system (e.g., one or more I/O devices 135, or devices in network 175).

While interrupt controller 160 is depicted as an entity distinct from CPU 150, alternate embodiments may include the structure and/or function of interrupt controller 160 within the CPU. The interrupt controller generally includes a plurality of registers, and the values contained in those registers may indicate the nature of the interrupt(s) and prescribed actions to handle the interrupt(s).

The plurality of registers of interrupt controller 160 may be organized or classified into one or more logical levels. Physically, registers may be of any feasible size, and may be identical throughout the various levels; alternately, registers may be the same within a particular level but may vary across levels (e.g., multiple 64-bit registers corresponding to one level and multiple 32-bit registers corresponding to another level). Registers may be contained in a single, contiguous memory (such as a high-speed memory within CPU 150, or within interrupt controller 160), or may be preferentially distributed within a single memory or across multiple memories; for example, the registers at one level may be assigned to a block of a particular memory, while the registers of another level may be assigned to another block of the memory, or to another memory altogether.

The levels of registers may be interconnected to form a logical hierarchy. Any particular register may be linked to one or more additional registers at the same or at different levels; thus the entire plurality of registers forms a hierarchical structure. Registers may be linked by mapping to one or more additional registers, using one or more bits within each register to indicate an address or other identifier for the one or more additional registers to which the register is linked. For example, eight bits of a 64-bit register may be designated to store addresses corresponding to one or more additional registers linked to the register; of course, any number of bits may be selected.

Figure 2:
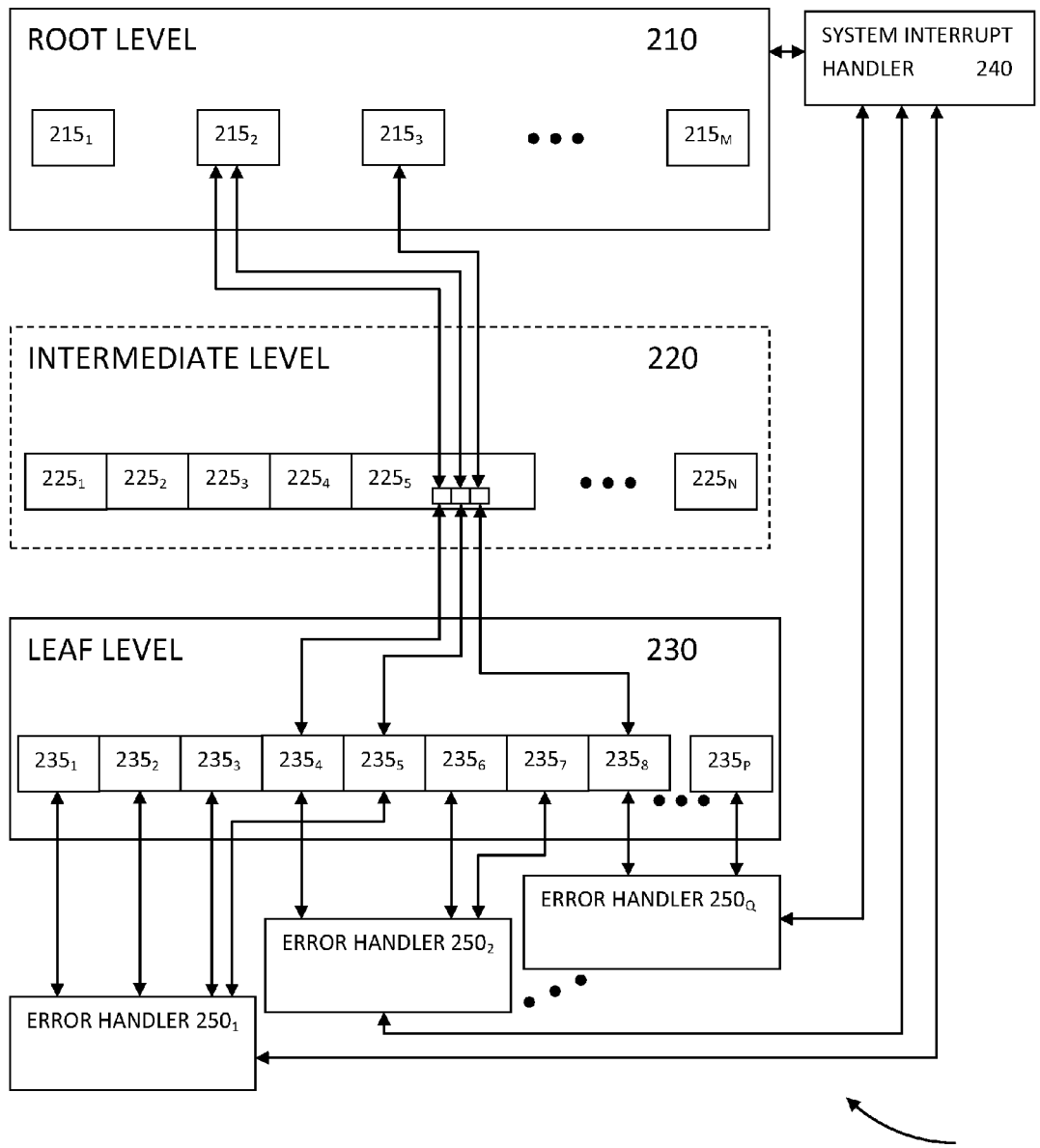
FIG. 2 illustrates a hierarchical interrupt register structure of an interrupt controller, according to one embodiment described herein.

FIG. 2 illustrates a hierarchical interrupt register structure of an interrupt controller, according to one embodiment. For example, the register structure depicted may be employed in interrupt controller 160.

As shown, interrupt controller 160 contains multiple registers ($215_{1-M}$, $225_{1-N}$, $235_{1-P}$) arranged into three different levels. Alternate embodiments may arrange registers into a different number of levels (for example, two levels or five levels). At root level 210, which as shown is the highest logical level of the register hierarchy, are one or more root-level registers $215_{1-M}$. Each root-level register may be coupled to one or more lower-level registers; in one embodiment, root-level registers may be linked only with registers of the next lower level (in other words, adjacent levels). In alternate embodiments, root-level registers may be linked to registers at one or more lower levels, which may include non-adjacent levels. Each of the root-level registers may be configured (and linked with lower-level registers accordingly) to represent a respective category or class of interrupts. Example interrupt classes may include errors such as recoverable errors or fatal errors, or status-related interrupts such as network interrupts, debug interrupts, and performance interrupts.

The hierarchical interrupt register structure may optionally include one or more intermediate levels between the highest and lowest levels of registers. As shown, interrupt controller 160 includes one intermediate level 220, which may contain multiple intermediate-level registers $225_{1-N}$. In one embodiment, the intermediate-level registers may each designate sufficient memory space to store two or more addresses or other identifiers, thereby allowing the intermediate-level registers to map to at least one higher-level register and at least one lower-level register.

The hierarchical interrupt register structure also includes a leaf level 230, corresponding to a lowest level of the hierarchy. At leaf level 230 are one or more leaf-level registers $235_{1-P}$. In one embodiment, all interrupts for the computing system originate at the leaf level and the interrupt information may be transmitted to higher level registers using the hierarchical links; at the higher levels, the interrupts may generally be handled through a central (or at the very least, a more centralized) coordination. In one embodiment, a portion of the leaf-level registers is designated for identifying interrupts, and each bit of the designated portion corresponds to a respective interrupt. For example, 40 bits of a 64-bit register may be designated for identifying interrupts, and the remaining 24 bits may be designated to store linked register addresses or other data related to handling interrupts.

Interrupt controller 160 also includes a system interrupt handler 240 that is generally responsible for addressing and resolving all of the system's interrupts to quickly return CPU 150 to executing computing threads. As depicted, system interrupt handler 240 is linked to the registers at root level 210, as well as multiple error handlers $250_{1-Q}$ (which are linked to registers at the leaf level 230).

As described above, each of the root-level registers may be configured to represent a respective class of interrupts. System interrupt handler 240 includes logic for detecting (for example, using the registers at the root level) the interrupts occurring throughout the hierarchy, for handling interrupts generally, and for selectively routing the handling of interrupts to the error handlers $250_{1-Q}$. The logic may be included in hardware or firmware within interrupt controller 160. System interrupt handler 240 may be generally configured to handle interrupts by default (i.e., the system interrupt handler will handle interrupts directly unless certain criteria for routing are met), or may be configured to handle interrupts only by exception (i.e., the system interrupt handler will route interrupts by default). The system interrupt handler may route interrupts across one or more error handlers, which may be routines assigned to and configured to process a subset of the interrupts in the hierarchy. These error handlers, when called or invoked by the system interrupt handler, are responsible for processing the particular interrupt(s) and returning to the system interrupt handler as quickly as possible. Partial or full redundancy may exist between error handlers, such that for a given interrupt in the register hierarchy, two or more error handlers may be configured to process the interrupt, though the system interrupt handler will typically route the interrupt to only one error handler.

The system interrupt handler may selectively route the interrupts based on the class of interrupt, which may be indicated by which root-level register has reported the interrupt to the system interrupt handler. Additionally or alternatively, the system interrupt handler may selectively route interrupts based on an amount of time required to execute the recovery action prescribed for the interrupt. In one embodiment, when the amount of time required to complete the recovery action would exceed a threshold (i.e., the recovery action is long-running), the system interrupt handler does not handle the interrupt directly, but routes the interrupt to an assigned error handler. In an alternate embodiment, the recovery action may be measured in processor cycles or another measure of computational expense, and the threshold may relate to this measure.

By selectively routing the handling of interrupts to assigned error handlers, the system interrupt handler does not remain occupied with handling certain interrupts (or waiting for the interrupts to be handled), but instead is free to continue receiving (and handling or routing) interrupts; this routing function may thus prevent a performance bottleneck in the computing system caused by numerous or long-running recovery actions occupying the system interrupt handler.

One or more interrupts for computing system 100 may not require a recovery action to be taken by the system interrupt handler 240 in order to clear the error and return to computing threads. For those interrupts requiring recovery actions to be taken, each bit representing a respective interrupt may be associated with a particular error handler $250_{1-Q}$, in one embodiment. As depicted, at least one bit from each of leaf-level registers $235_{1, 2, 3, 5}$ is associated with error handler $250_1$, at least one bit from each of leaf-level registers $235_{4, 6, 7}$ is associated with error handler $250_2$, and at least one bit from each of leaf-level registers $235_{8, P}$ is associated with error handler $250_Q$. While these example associations were selected for clarity, bits of a register and error handlers may be associated in any feasible way. For example, leaf-level register $235_1$ may have multiple bits, with one or more bits (representing one or more interrupts) associated with each of error handlers $250_{1-Q}$, or with certain ones of the error handlers. Likewise, each of error handlers $250_{1-Q}$ may be associated with one or more bits from some or all of leaf-level registers $235_{1-P}$, and thus may be assigned to handle the interrupts corresponding to those bits.

Figure 3:
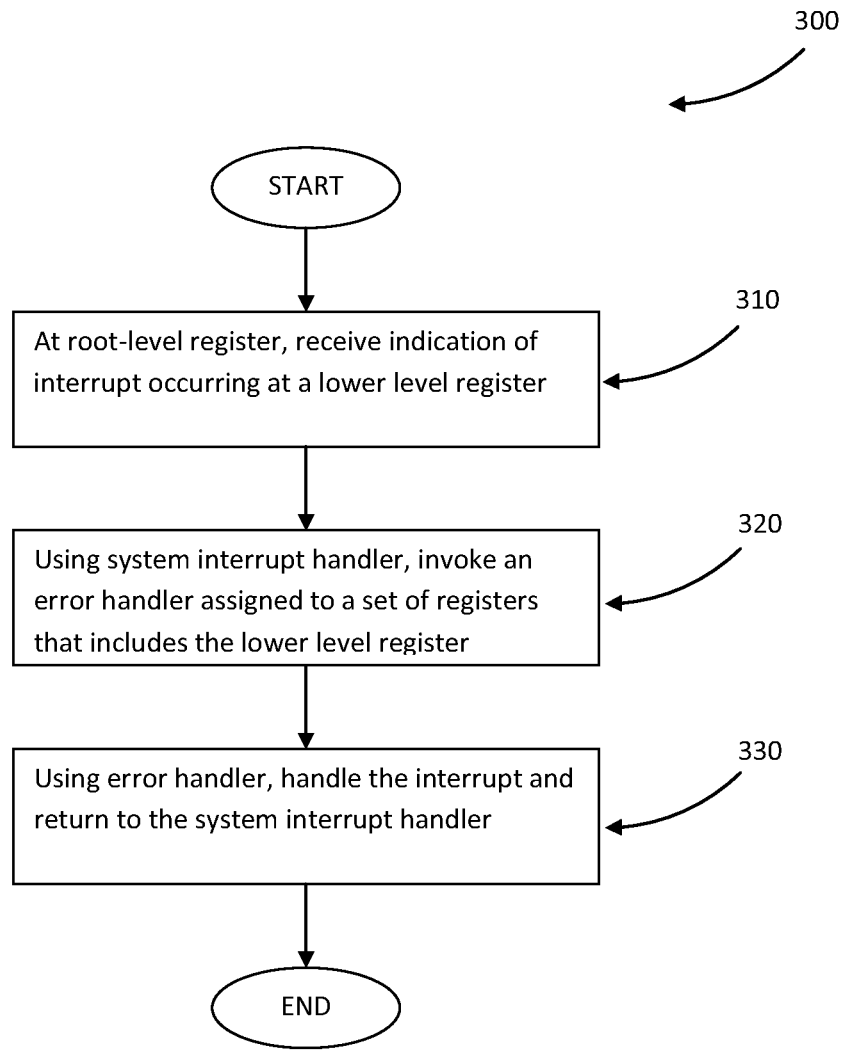
FIG. 3 illustrates a method for handling interrupts within a hierarchical interrupt register structure, according to embodiments described herein.

FIG. 3 illustrates a method for handling interrupts within a hierarchical interrupt register structure, according to embodiments described herein. The method 300 may be implemented using an interrupt controller, such as interrupt controller 160 described above. The method begins at block 310, where a root-level register (such as one of root-level registers $215_{1-M}$) receives an indication of an interrupt occurring at a lower-level register. For example, a bit of a leaf-level register was driven to a logical "one" from the output of a coupled device, or by a routine executing on the CPU 150. The lower level at which the interrupt occurred may be adjacent to the root level, such that the lower level register provides the interrupt information directly to the root-level register; however, embodiments may also provide one or more intermediate levels, so that the path to transfer the interrupt information to the root-level register includes one or more intermediate registers.

At block 320, the method uses a system interrupt handler to invoke an error handler assigned to the lower-level register to address the indicated interrupt. While described as a single system interrupt handler that is responsible for processing all interrupts for the particular computing system, the routing functions disclosed herein may be performed using an interrupt handler operating at any logical level (for example, a computing system may have multiple interrupt handlers operating at the same level, or may have a hierarchy of interrupt handlers).

The system interrupt handler, in response to receiving the indicated interrupt, may use data associated with the interrupt as well as data contained in the registers along the interrupt path, to locate the exact bit(s) in the lower-level register that indicated the interrupt. For example, the system interrupt handler may receive an interrupt indication at a root-level register corresponding to a "network" class of interrupts. While error handlers may feasibly be assigned to handle interrupts based solely on an overall class of the interrupt, the system interrupt handler may advantageously determine which lower-level register (and which specific bit(s)) triggered the interrupt. By determining the origination of the interrupt, the system interrupt handler may invoke an error handler selectively assigned to handle interrupts originating from particular register(s) or bit(s); this may provide a more efficient overall response.

At block 330, the method uses the invoked error handler to handle the interrupt and return to the system interrupt handler. As described above, by routing the handling of interrupts from a (centralized) system interrupt handler to assigned error handlers, the system interrupt handler may remain free to continue receiving interrupts (and handling or routing as appropriate), and may thus improve the computing system's overall performance. By returning to the system interrupt handler, the invoked error handler may essentially acknowledge its receipt of assignment to handle the particular interrupt.

Figure 4:
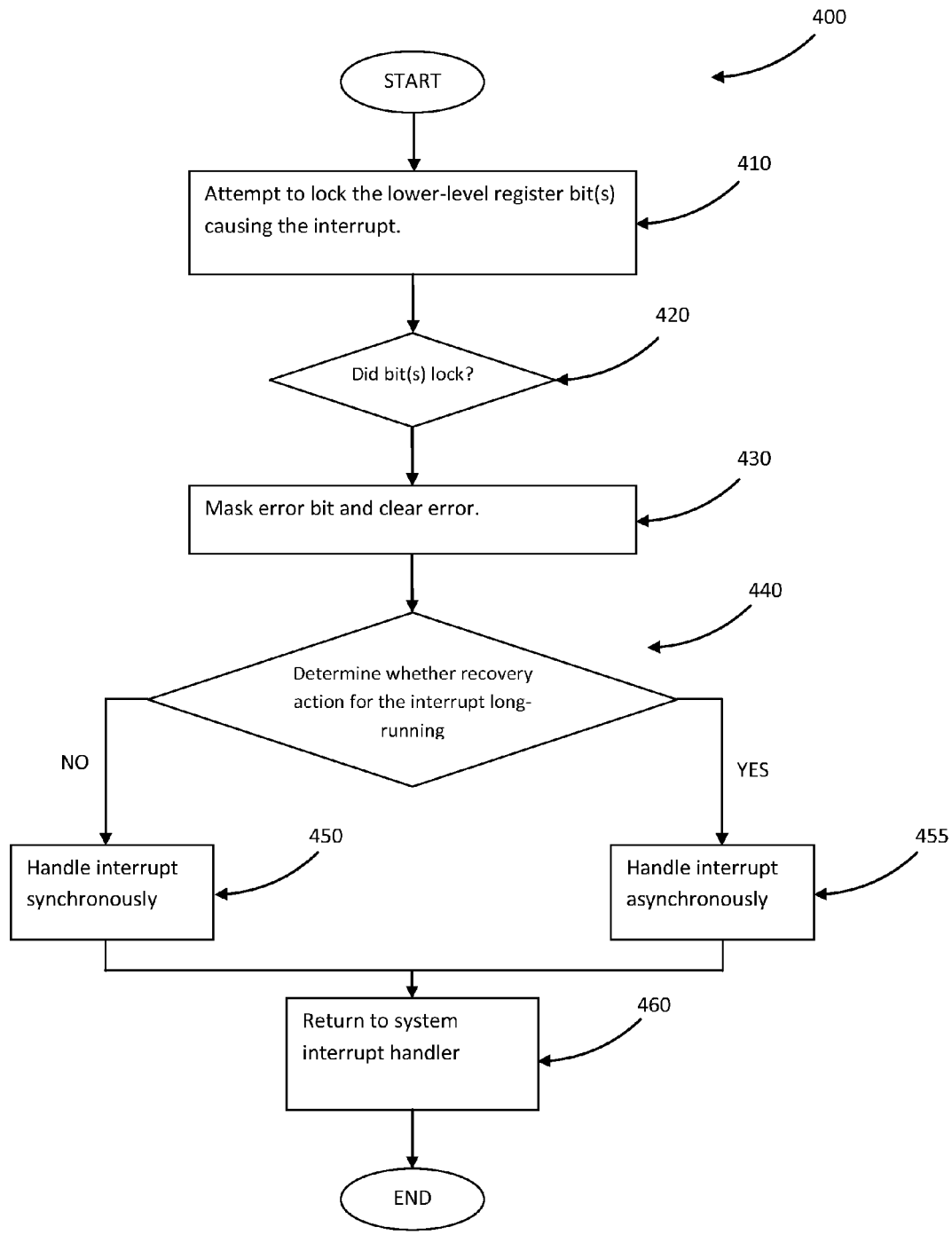
FIG. 4 illustrates a method for an error handler to process an interrupt when invoked by a system interrupt handler, according to one embodiment described herein.

FIG. 4 illustrates a method for an error handler to process an interrupt when invoked by a system interrupt handler, according to one embodiment. After the particular error handler has been invoked by the system interrupt handler, such as according to method 300, the method 400 begins at block 410, where the error handler attempts to lock the bit(s) in the leaf-level register at which the interrupt originated. Locking the bit(s) prevents the bit(s) from being altered, and may be attempted in order to prevent subsequent interrupts (and the operation of their associated error handlers) from altering data that may be needed to process the current error. Naturally, other data contained within the leaf-level register and associated with the interrupt may also be locked at this step.

At block 420, the method determines whether the bit(s) were successfully locked by the error handler. If the bit(s) were not successfully locked by the error handler at block 410, the method proceeds to block 460 and returns to the system interrupt handler. Being unable to lock the bit(s) may indicate that another error handler is concurrently processing an interrupt (which necessitated locking the bit(s) and/or associated data). Having the error handler repeatedly checking whether a lock has become available may be detrimental to the performance of the computing system; to increase performance, the method may instead assume that the current lock holder (i.e., the other error handler that is already operating on an interrupt) will complete the interrupt processing. In one embodiment, upon failure of an attempt to lock the bit(s), the error handler may receive a return code indicating failure. In response to receiving this failure return code, the error handler may then proceed to block 460 and return to the system interrupt handler.

If, however, the bit(s) were successfully locked by the error handler at block 410 (indicating that no other error handler had currently locked the bit(s)), the method proceeds to block 430, where the error handler masks the error bits and clears the interrupt. As is known in the art, masking interrupt bits generally allows executing software to ignore interrupts (whether hardware or software) corresponding to the masked bits. Here, the error bits may be masked in order to complete the method uninterrupted.

At block 440, the method determines whether the recovery action for the interrupt is a long-running recovery action; that is, whether execution of the recovery action would require an amount of time exceeding a threshold. In an alternate embodiment, the recovery action may be measured in processor cycles or some other measure of computational expense, and the threshold may relate to this measure. If the recovery action is determined to not be long-running ("NO"), the method proceeds to block 450, where the interrupt is handled synchronously (i.e., the recovery action is begun substantially immediately by the error handler). Following completion of the recovery action, the method will proceed to block 460 and return to the system interrupt handler.

However, if the recovery action is determined to be long-running (that is, requiring more than a threshold value of time to complete; "YES"), the method proceeds to block 455, where the error handler handles the interrupt asynchronously before returning to the system interrupt handler at block 460. To accomplish this, the error handler may instruct an asynchronous thread to handle the interrupt, so that handling of the interrupt may be completed without significantly interfering with the completion of other tasks (e.g., computing tasks or synchronous error handling); for example, the interrupt may be handled using available time when other tasks are waiting (or blocked). The error handler may optionally capture data required to handle the interrupt, and transmit that data to the asynchronous thread with other information about the interrupt.

Figure 5:
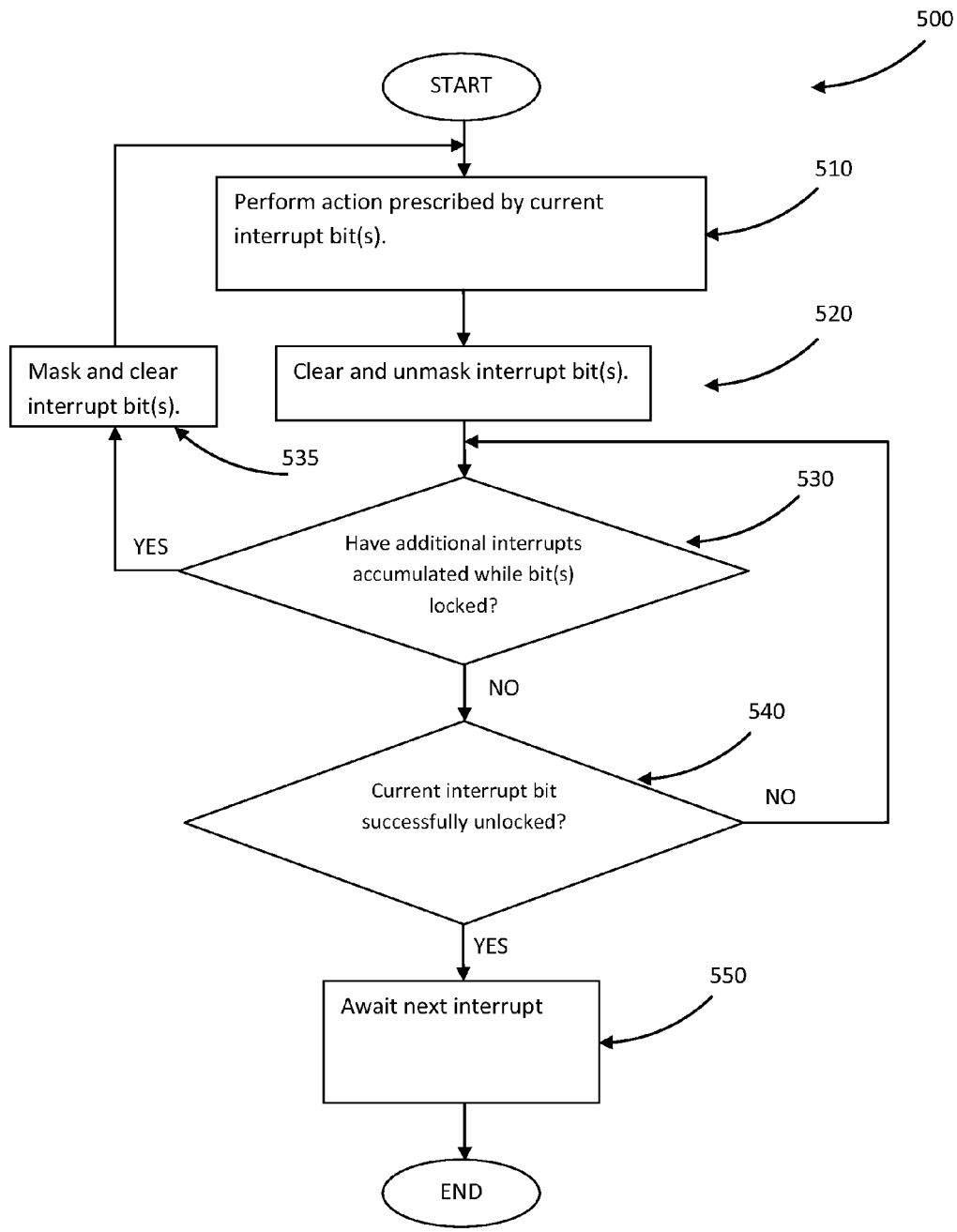
FIG. 5 illustrates a method for an error handler to asynchronously handle an interrupt, according to one embodiment described herein.

FIG. 5 illustrates a method for an error handler to asynchronously handle an interrupt, according to one embodiment. For example, this method may occur as part of block 455 of method 400, described above. Method 500 begins at block 510 by performing the recovery action prescribed for the current interrupt, which may be accomplished using an asynchronous thread and generally according to the description of block 455 above. After completion of the recovery action, at block 520 the bit(s) corresponding to the interrupt may be cleared, and any bits previously masked may be unmasked in order to resume receiving other (hardware or software) interrupts. At block 530, the method determines whether any additional interrupts have accumulated while the bit(s) corresponding to the interrupt (which recovery actions are now completed) were locked. While the error handler was processing the previous interrupt, the system interrupt handler may have selectively routed one or more additional interrupts to the particular error handler for handling. If any interrupts have accumulated to be handled by the particular error handler ("YES"), the method proceeds to block 535, where the error handler may again mask the error bits and clear the particular interrupt bit(s) for the next accumulated interrupt before returning to block 510 to perform the prescribed action to handle the accumulated interrupt; this cycle may continue until each accumulated interrupt has been handled and no interrupts remain for the error handler.

However, if no interrupts have accumulated (or the error handler has handled all accumulated interrupts; "NO"), the method proceeds to block 540, where the method attempts to unlock the bit(s) corresponding to the now-completed interrupt. Note that the lock had been set to prevent subsequent interrupts (and their respective error handlers) from altering data required to complete processing of the current interrupt; now that processing of the interrupt is completed, the related data may be altered as required. The attempt to unlock the bit(s) may fail when another thread or process (e.g., from another error handler) is concurrently attempting to acquire a lock on the same bit(s); of course, the other thread/process may also not be able to obtain a lock on the bit(s) while the current error handler holds its lock. The other thread/process seeking the lock may return a code indicating failure to its corresponding error handler, such as described above with respect to block 410. And as described above with respect to block 420, the corresponding error handler, upon receiving the failure code, may assume that the current lock holder (i.e., the other error handler that is already operating on an interrupt) will complete the interrupt processing, and so the interrupt is accumulated for handling by the current lock holder. Thus, a failure of an error handler to unlock the bit(s) of the current interrupt will tend to indicate that additional interrupts corresponding to those bit(s) are being accumulated for the error handler. Accordingly, if the error handler fails to unlock the bit(s) at block 540 ("NO"), the method returns to block 530 to determine which interrupts have accumulated.

If, however, the bit(s) for the current interrupt are successfully unlocked at block 540 ("YES"), the method continues to block 550, where the error handler awaits assignment of the next interrupt from the system interrupt handler. Method 500 terminates following completion of this step.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of handling interrupts in a processor comprising a hierarchical interrupt register structure, the method comprising:
    receiving, at a root-level register of the interrupt register structure, an indication of an interrupt occurring at a lower level register of the interrupt register structure;
    invoking, using a system interrupt handler of the processor, an error handler assigned to a set of registers of the interrupt register structure that includes the lower level register;
    attempting, using the error handler, to lock one or more bits of the lower level register that caused the interrupt; and
    handling, upon determining the attempt to lock the one or more bits was successful, the interrupt using the error handler,
    wherein the error handler is further configured to return execution to the system interrupt handler upon determining the attempt to lock the one or more bits was not successful.

2. The method of claim 1, further comprising:
    determining the lower level register that triggered the indication.

3. The method of claim 1, wherein handling the interrupt using the error handler is completed asynchronously upon determining that execution of a recovery action for the interrupt would require an amount of time exceeding a predetermined threshold.

4. The method of claim 3, further comprising:
    capturing, using the error handler, data required to handle the interrupt asynchronously; and
    instructing an asynchronous thread to execute the recovery action before returning execution to the system interrupt handler.

5. The method of claim 1, further comprising:
determining, using the system interrupt handler and based on a determined amount of time required to complete a prescribed recovery action for the interrupt, whether to route the interrupt to the error handler or to directly handle the interrupt.

6. The method of claim 1, wherein the invoked error handler is one of a plurality of error handlers, each of the plurality of error handlers assigned to a respective set of registers of the interrupt register structure.

7. The method of claim 6, wherein at least two error handlers of the plurality of error handlers have corresponding sets of registers that include a same lower level register of the interrupt register structure, the method further comprising:
selecting, using the system interrupt handler, one of the at least two error handlers to route the interrupt corresponding to the same lower level register.

8. The method of claim 1, wherein the interrupt register structure comprises a plurality of root-level registers, and wherein each root-level register is designated to indicate a respective class of interrupts.

9. The method of claim 8, wherein the system interrupt handler is further configured to handle interrupts differently based on the indicated class of interrupts.

10. The processor of claim 8, wherein the indicated class of interrupts includes one of recoverable errors, fatal errors, network interrupts, debug interrupts, and performance interrupts.

11. A processor, comprising:
a hierarchical interrupt register structure, comprising:
    a plurality of lower level registers, and
    at least one root-level register configured to indicate an interrupt occurring at a first lower level register of the plurality of lower level registers; and
a system interrupt handler configured to invoke, upon receiving an indication of an interrupt occurring at the first lower level register, an error handler assigned to a set of registers of the interrupt register structure that includes the first lower level register,
wherein the error handler is configured to:
    attempt to lock one or more bits of the first lower level register that caused the interrupt;
    handle, upon determining the attempt to lock the one or more bits was successful, the interrupt; and
    return execution to the system interrupt handler upon determining the attempt to lock the one or more bits was not successful.

12. The processor of claim 11, wherein the interrupt register structure comprises a plurality of root-level registers, and wherein each root-level register is designated to indicate a respective class of interrupts.

13. The processor of claim 12, wherein the system interrupt handler is configured to handle interrupts differently based on the indicated class of interrupts.

14. The processor of claim 12, wherein the indicated class of interrupts includes one of recoverable errors, fatal errors, network interrupts, debug interrupts, and performance interrupts.

15. The processor of claim 11, wherein the error handler is further configured to handle the interrupt asynchronously upon determining that execution of a recovery action for the interrupt would require an amount of time exceeding a predetermined threshold.

16. The processor of claim 15, wherein the error handler is further configured to:
capture data required to handle the interrupt asynchronously; and
instruct an asynchronous thread to execute the recovery action.

17. The processor of claim 11, wherein the system interrupt handler is further configured to determine, based on a determined amount of time required to complete a prescribed recovery action for an interrupt, whether to directly handle the interrupt or to invoke the error handler to handle the interrupt.

18. The processor of claim 11, wherein at least two error handlers of the plurality of error handlers have corresponding sets of registers that include a same lower level register of the interrupt register structure, wherein the system interrupt handler is further configured to:
select one of the at least two error handlers to route the interrupt corresponding to the same lower level register.

* * * * *